United States Patent
Opaluch et al.

(10) Patent No.: US 8,406,407 B2
(45) Date of Patent: Mar. 26, 2013

(54) SYSTEM AND METHOD FOR PROVIDING CUSTOM ALERTS

(75) Inventors: Robert E. Opaluch, Riverside, RI (US); David C. Robbins, Grafton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1052 days.

(21) Appl. No.: 12/164,588

(22) Filed: Jun. 30, 2008

(65) Prior Publication Data

US 2009/0323918 A1 Dec. 31, 2009

(51) Int. Cl.
*H04M 3/42* (2006.01)
*H04M 1/00* (2006.01)
*H04M 3/00* (2006.01)

(52) U.S. Cl. ...... 379/207.16; 379/373.01; 379/373.02; 379/374.03; 379/375.01; 379/376.01; 455/567

(58) Field of Classification Search ............. 379/207.16, 379/201.01, 142.05, 373.02, 252, 350, 242, 379/374.03, 376.01, 373.01, 375.01; 455/567, 455/418

See application file for complete search history.

(56) References Cited

U.S. PATENT DOCUMENTS

| 7,454,009 | B2 * | 11/2008 | Aupperle et al. | 379/373.02 |
| 2003/0109289 | A1 * | 6/2003 | Ito | 455/567 |
| 2004/0202300 | A1 * | 10/2004 | Cooper et al. | 379/201.01 |
| 2007/0161412 | A1 * | 7/2007 | Nevid et al. | 455/567 |
| 2007/0172042 | A1 * | 7/2007 | Winikoff et al. | 379/142.05 |
| 2009/0143057 | A1 * | 6/2009 | Arun et al. | 455/418 |

* cited by examiner

*Primary Examiner* — Thjuan K Addy (57) ABSTRACT

A system and method for providing custom alerts including a processor configured to retrieve a custom alert from a custom alert provider, a receiver configured to receive, from a user, a request to initiate communication with a communications agent, and a transmitter configured to transmit one or more signals over a network to communicate with the communications agent, wherein transmitting the one or more signals includes transmitting the custom alert for output at the communication agent.

21 Claims, 5 Drawing Sheets

Figure 5

SYSTEM AND METHOD FOR PROVIDING CUSTOM ALERTS

BACKGROUND INFORMATION

A "ringtone" or "ring tone" is a sound made by a telephone to indicate an incoming call or text message. As mobile communications becomes more widely used around the world, ringtones have become extremely diverse, leading to increased personalization and customization. For example, some mobile communications devices allow users to associate different ringtones with various family members and/or friends. These devices may also play various types of ringtones, such as monophonic, polyphonic, or truetone ringtones. However, despite these advances, many users are still unable to prioritize and/or preview incoming calls. For example, even though a ringtone may indicate that a family member or friend is calling, the party being called may not know importance of the call or have any idea of the content of the call. As a result, current devices and system lack a technique to comprehensively and effectively provide custom alerts to preview an incoming call and/or to indicate the importance/priority of that incoming call.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description are exemplary and explanatory only and are not restrictive.

Exemplary embodiments may provide a system and method for providing custom alerts. That is, exemplary embodiments may, among other things, expand and optimize communications by comprehensively and effectively provide custom alerts to preview an incoming call and/or to indicate the importance/priority of that incoming call.

As discussed above, current systems cannot allow users of communications devices to preview content of an incoming call and/or to identify the importance/priority of that incoming call. For instance, a physician may receive an incoming call on a mobile communications device from a variety of callers. Although the physician may set a ringtone on the communications device to indicate when the physician's daughter is calling, the physician cannot determine from the ringtone itself whether the incoming call is urgent or what the content of that call is going to be. Because a physician may be extremely busy (e.g., consulting with patients, performing surgeries, conducting research, etc.), the ability to receive a custom alert on the physician's communications device from the daughter may be extremely beneficial. In particular, a custom alert that is capable of indicating to the physician whether or not the incoming call requires his immediate attention may be highly advantageous.

Figure 1:
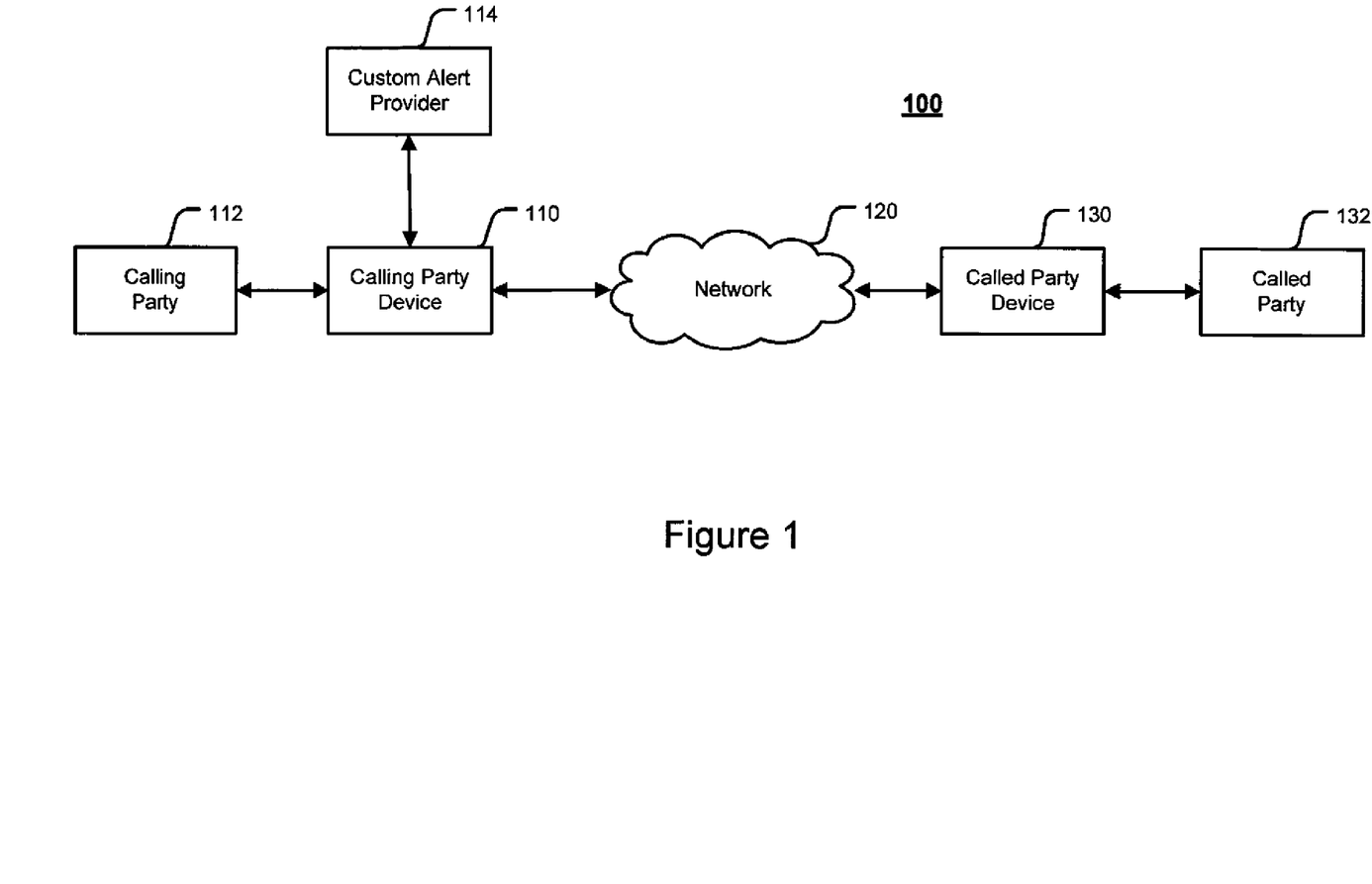
FIG. 1 depicts a block diagram of a system architecture for providing custom alerts, according to an exemplary embodiment.

FIG. 1 depicts a block diagram of a system architecture for providing custom alerts 100, according to an exemplary embodiment. It should be appreciated that system 100 is a simplified view for providing custom alerts and may include additional elements that are not depicted. As illustrated, the system 100 may include a calling party device 110. The calling party device 110 may be operated by a calling party 112 and may be communicatively coupled to a custom alert provider 114. The calling party device 110 may communicate over a network 120 to other various devices. For example, the calling party device 110 may communicate with a called party device 130, which may be operated by a called party 132.

The calling party device 110 and called party device 130 may be communications systems and/or devices. These may include desktop computers, laptops/notebooks, servers or server-like systems, modules, Personal Digital Assistants (PDAs), smart phones, wireline phones, cellular phones, mobile phones, and satellite phones. Although communications systems/devices may typically be directed to those having telephone capability, it should be appreciated that various systems/devices may also be used. These may include MP3 players, video players, personal media players, personal video recorders (PVR), watches, gaming consoles/devices, navigation devices, televisions, printers, and/or other devices capable of receiving and/or transmitting signals. It should be appreciated that the communications device/system may be mobile, handheld, or stationary. It should also be appreciated that the communications device/system may be used independently or may be used as an integrated component in another device and/or system.

The network 120 may be any network, such as a local area network (LAN), a wide area network (WAN), a service provider network, the Internet, or other similar network. It should be appreciated that the network may use electric, electromagnetic, and/or optical signals that carry digital data streams.

Communication between the various service communications systems/devices may be achieved via transmission of electric, electromagnetic, optical, and/or wireless signals and/or packets that carry digital data streams using a standard telecommunications protocol and/or a standard networking protocol. These may include Session Initiation Protocol (SIP), Voice Over IP (VOIP) protocols, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols. Other protocols and/or systems that are suitable for transmitting and/or receiving data via packets/signals may also be provided. For example, cabled network or telecom connections such as an Ethernet RJ45/Category 5 Ethernet connection, a fiber connection, a traditional phone wireline connection, a cable connection or other wired network connection may also be used. Communication between the network providers and/or subscribers may also use standard wireless protocols including IEEE 802.11a, 802.11b, 802.11g, etc., or via protocols for a wired connection, such as an IEEE Ethernet 802.3.

Referring to FIG. 1, the calling party device 110 may retrieve one or more custom alerts from the custom alert provider 114. A custom alert may be a ringtone or other alert. In one embodiment, the ringtone may be monophonic, such as a musical ringtone. In another embodiment, the ringtone may be polyphonic, such as a ringtone that can play several types of tones at a time. A polyphonic ringtone may be produced by using sequenced recording methods, such as MIDI, or other recording techniques. In yet another embodiment, the ringtone may be truetone (e.g., "realtone," "mastertone," "superphonic ringtone," etc.). A truetone may be a ringtone encoded with a high fidelity format such MP3, AAC, WMA, or other similar format (e.g., truetones may be excerpts from popular songs used as ringtones). Other custom alerts may also be provided, such as recorded voice, images, videos, flashing patterns, multimedia, vibrations, or combinations thereof.

The custom alert provider 114 may provide one or more custom alerts. In one embodiment, the custom alert provider 114 may include a library of custom alerts. The library of custom alerts may be sold or otherwise provided (e.g., selected, ordered, redeemed, purchased, traded, downloaded, etc.) by the custom alert provider 114 as pre-recorded custom alerts. The library of custom alerts may be stored locally on a communications device (e.g., the calling party device 110, etc.), remotely in one or more servers or data storage systems, or a combination thereof In one example, a calling party 112 may order one or more custom alerts from a website for download onto a communications device. In one embodiment, this may be achieved from the communications device itself (e.g., the calling party device 110). In another embodiment, this may be achieved via a computer, where the custom alert may be download onto the computer and later to the communications device or where the custom alert may be ordered via computer for direct download to the communications device. It should also be appreciated that other various embodiments may also be provided.

In another example, the calling party 112 may order a custom alert from a custom alert provider 114 for direct transmission over the network 120 to the called party device 130. In yet another example, the calling party 112 may view all the custom alerts stored in the calling party device 110 and select one or more custom alerts to send to the called party device 130.

In another embodiment, a calling party 112 may order one or more custom alerts directly from his or her communications device (e.g., the calling party device 110). For example, a calling party 112 may view a plurality of custom alerts from the calling party device 110 that are stored at one or more servers or data storage systems of a service provider and/or a third party.

In yet another embodiment, the custom alert provider 114 may provide a way to create a custom alert. For instance, the custom alert provider 114 may include a recording device. The recording device may be provided at the calling party device 110, a service provider, and/or third party. In one embodiment, a calling party 112 may use the recording device to record his or her voice and configure the recorded voice to be a custom alert. It should be appreciated that this may be achieved remotely on a communications device, a third party website, or other locations. For example, a calling party 112 may create a custom alert via a third party website or on another computer platform for download unto his or her communications device. Such a custom alert generator or editor may provide greater flexibility and customizability. It should be appreciated that the custom alert may be generated from a communications device and/or a network-accessible device (e.g., computer). Other various embodiments may also be provided.

It should also be appreciated that a custom alert provider 114 may also provide other editing functions and features for generating and manipulating custom alerts. These may include selecting various backgrounds (e.g., tones, music, priority rings, vibration patterns, flashing patterns, colors, etc.), foregrounds (e.g., voice recordings, etc.), custom alert previews, etc. It should be appreciated that any of these functions and features may be approved, repeated, cancelled, and/or modified for optimizing personalization and customizability. It should also be appreciated that the custom alert provider 114 may synthesize a custom alert based on information such as the priority of the call, the time of day, the location of the calling party 112, and/or the location of the called party 132. In another embodiment, a plurality of customer alerts from various sources may be combined and/or subtracted to create a new custom alert. For example, a party may use a self-made song a background layer, a friend's voice saying something as vocal layer, an image as a visual layer, etc., to form a custom alert. It should be appreciated that various these layers may be added and/or subtracted to comprehensively customize and personalize custom alerts.

The custom alert may include properties that circumscribe how or when it may be presented to the called party. For example, a custom alert may be used only a single time, a limited number of times, or for a limited period of time. A custom alert may also be allowed or prohibited from being saved by the called party 132, e.g., in the called party device 130 or other storage. For instance, in one embodiment, a custom alert may be purchased by a calling party 112 who sends the custom alert from the calling party device 110 to a called party 132, at a called party device 130, which may store and use the custom alert. In this example, it would be as if the called party 132 purchased the custom alert for use at the called party device 130. In another embodiment, the custom alert may not be allowed to be stored or used at the called party device 130. In yet another embodiment, the custom alert may only be allowed to be used to identify the same caller. Other variations may also be realized.

It should also be appreciated that custom alert may be "one use" alerts. For example, such a custom alert may summarize a particular call and be used to identify a particular caller. However, the custom alert may be originate from that caller, but rather, from another source. This may be particular useful in emergency broadcast situations, for sending anonymous custom alert "gifts," secretaries sending custom alerts on behalf of their bosses, etc. In this example, reply back features may be limited and/or customized to suit the needs of the transmitting/receiving party.

It should be appreciated that while the custom alert provider 114 may be included locally in the calling party device 110 or remotely at one or more servers or data storage systems, other various embodiments may also be considered. For example, a calling party device 110 may include local software made for purchasing/ordering/generating custom alerts at a remote server or service provider system. It should also be appreciated that the devices and/or components of system 100 are shown as separate components, these may be combine into greater, lesser, or equal components to optimize flexibility.

Figure 2:
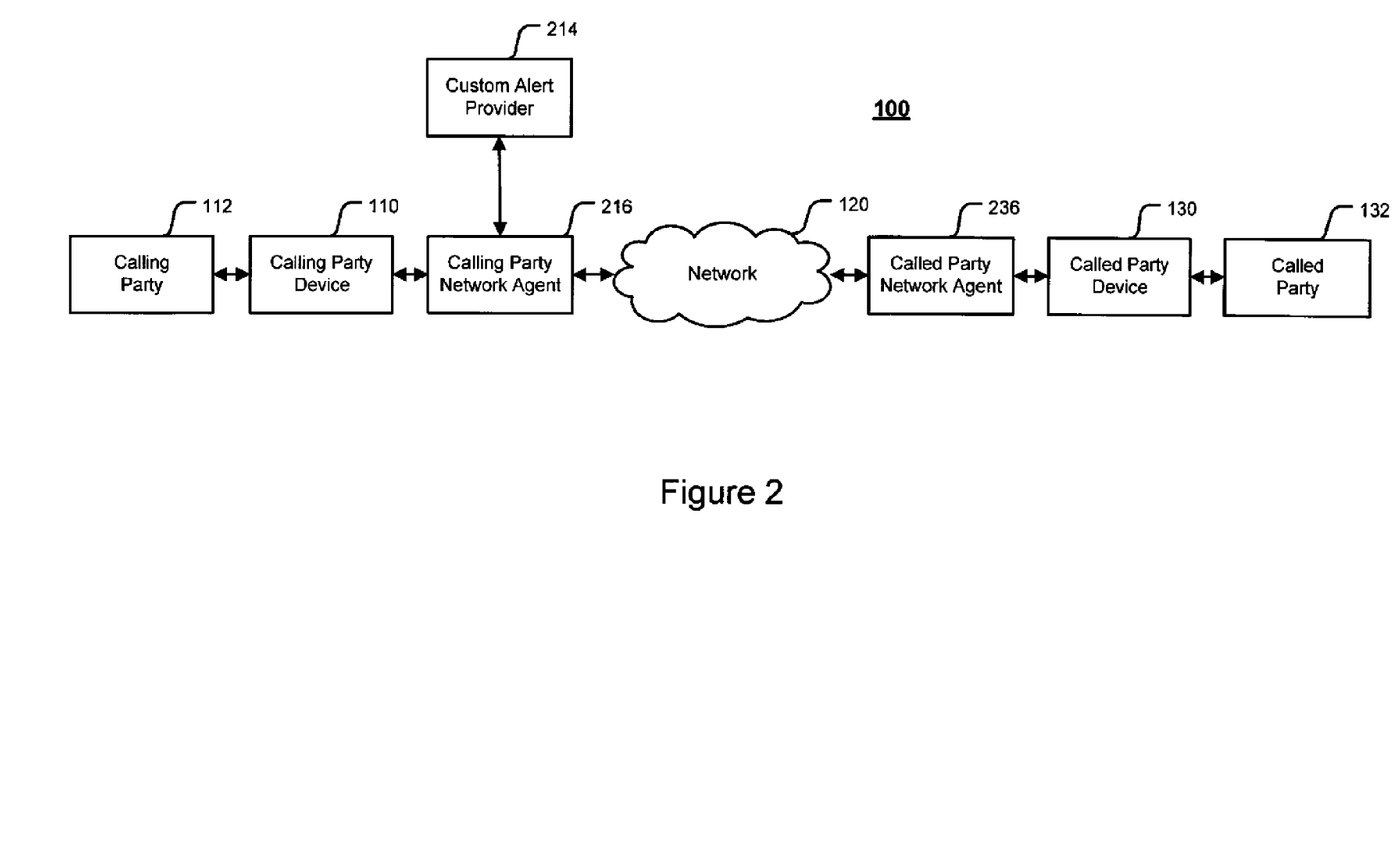
FIG. 2 depicts a block diagram of a system architecture for providing custom alerts, according to another exemplary embodiment.

FIG. 2 depicts a block diagram of a system architecture for providing custom alerts 200, according to another exemplary embodiment. Similar to FIG. 1, the system 200 may include a calling party device 110, which may be operated by a calling party 112. The calling party device 110 may communicate over a network 120 to other various devices. For example, the calling party device 110 may communicate with a called party device 130, which may be operated by a called party 132.

However, unlike FIG. 1, FIG. 2 may implement a calling party network agent 216, which is communicatively coupled to the calling party device 110. The calling party network agent may also be communicatively coupled to a custom alert provider 214. It should also be appreciated that the called party device 130 may also be communicatively coupled to a called party network agent 136. For example, the calling party 112 may operate the calling party device 110 to communicate, via the calling party network agent 216, over the network 120 to the called party network agent 236 coupled to the called party device 130 of the called party 132.

The system 200 of FIG. 2 depicts a variation of the implementation in which the calling party 110 and the called party 130 have network agents (e.g., the calling party network agent 216 and the called party network agent 236, respectively) that act on behalf of each party to select and manage custom alerts. The functions of such agents may include some or all of the functions attributed to the respective parties' devices in the implementation depicted in FIG. 1 and may include additional custom alert functions that are more effectively performed by network agents rather than devices.

For example, the calling party network agent 216 may act on behalf of any of several alternative devices belonging to or used by the calling party 112. Additionally, in another embodiment, the calling party network agent 216 may manage pre-configured custom alert policy defined by the calling party 112.

The called party network agent 236 may act on behalf of any of several alternative devices belong to or used by the called party 132 and may manage pre-configured custom alert policy defined by the called party 132. In addition, the called party network agent 236 may select a subset of all of the called parties' devices based on the received custom alert.

An example of a specific technology that may implement this invention is a set of devices and/or agents that manage multimedia communication sessions via Session Initiation Protocol (SIP), which may be defined by the Internet Engineering Task Force (IETF) in Requests for Comments (RFC) 3261. For example, in a SIP communication session, the calling party device 110 and called party device 130 may be SIP devices, which may also be referred to as SIP user agents. When the calling party 112 wishes to initiate a communication, the calling part 112 may cause the calling party device 110 to send a SIP INVITE request to the called party device 130 over the network 120. The called party device 130 may then alert the called party 132, and according to the called party's decision about whether or not to accept the communication, sends an acceptance or rejection response to the calling party device 110.

In a SIP implementation according to FIG. 1, the respective communications devices may exchange SIP requests and responses directly with one another. In a SIP implementation according to FIG. 2, the respective network agents 216, 236 may be SIP proxy servers or application servers. The application server for SIP implementation may be provided by a SIP service provider.

In a SIP implementation according to either FIG. 1 or FIG. 2, the custom alert may be passed from the calling party device 110 and/or calling party network agent 216 to the called party device 130 and/or called party network agent 236 in a SIP "Alert-Info" header associated with the SIP INVITE request. It should be appreciated that the Alert-Info header may be a standard element of SIP.

The representation of a custom alert in an Alert-Info header may take any of several forms. For example, in one embodiment, the custom alert may be a short media segment encoded for direct inclusion in the Alert-Info header. In another embodiment, the custom alert may be a resource identified, by prior standardization or other agreement, as a Universal Resource Name (URN), which may be defined by the IETF in RFC 2141. In yet another embodiment, the custom alert may be a resource accessible via the communication network by a scheme and address specified in a Uniform Resource Identifier (URI), which may be defined by the IETF in RFC 3986.

It should be appreciated that systems and methods discussed above for SIP environments may also be applied to non-SIP environments as well.

It should be appreciated that while embodiments are primarily directed to phone calls, other variations and/or various implementations may also be provided. For example, a package delivery driver may be delivering a package to destination (e.g., a home or residence). Traditionally, the driver may be required to find the home, stop and park the truck, and walk to deliver the package, not knowing whether a recipient at the destination may be available to receive and/or sign for the package. Therefore, in this scenario, as the driver drives up to the destination or as the driver is walking to deliver the package, the driver may send a custom alert (e.g., a ringtone that mimics a doorbell) to indicate that the driver is coming to deliver the package. In another embodiment, the custom alert may be a pre-recorded voice sound byte. For instance, a pre-recorded voice sound byte may state, "We are delivering a package from Ace Music, you need to sign for delivery to proceed." This custom alert may received by a network (e.g., LAN) at the destination and may be played one or more times instead of the traditional doorbell. Since the home network captures the custom alert, the homeowner may have this custom alert forwarded to their TV, computer, and/or other network devices to hear/see the custom alert. It should be appreciated that a home network (e.g., LAN), for example, despite being secured, may accept traffic (e.g., a custom alert) from the delivery driver's phone or device. The home network may include a security exception that permits communication with the delivery driver so that a custom alert may be transmitted over to the home network for the homeowner to be alerted. Such would greatly improve efficiency and provide a comprehensive technique to expand business an application models. Other various embodiments may also be realized.

Another example for providing custom alerts may be in emergency situations. For example, the Federal Emergency Management Agency (FEMA) may send an emergency custom alert to all home phones in a particular area code and/or zip code to warn of an emergency. In another embodiment, for example, an emergency custom alert may be sent to cell phones off of cell tower AX2739W. Other various embodiments may also be provided. Here, the emergency custom alert may warn of a dam collapse sending flood waters rushing down to a nearby town or city. In particular, the custom alert may instruct residents and drivers to seek higher ground immediately and avoid driving on roads. The custom alert may be heard on cell phones, played on home phones, and/or other equipment configured to receive custom alerts (e.g., televisions, PCs, etc.). Using a custom alert of exemplary embodiments, the emergency message/warning may be heard by parties even while driving or being busy with other activities. It should be appreciated that custom alerts may be provided to warn of various scales of emergencies. For example, these may include weather, natural disasters, traffic patterns/warnings, crime, etc.

It should be appreciated that in addition to custom alerts for incoming phone calls, embodiments may also be directed to voicemail directory preview. For example, embodiments described above may use a custom alert of a recorded voice to provide a called party 132 a preview of an incoming call. However, the custom alert of a recorded voice may also be stored at the called party device 130 or at a service provider communicatively coupled to the called party device 130. Here, the custom alert of a recorded voice may provide the called party to preview his or her voicemails at a later time. In situations where a called party 132 receives many calls (and therefore does not have the time or availability to answer or read these communications), a preview of the stored voicemails may be extremely beneficial and improve communication efficiency. It should be appreciated that while embodiments are directed to voicemails, the preview directory may also be applied to other communications, such as text messages, etc.

It should be appreciated that when voicemails are recorded, software may automatically generate a preview. For example, software may be provided to process content of a message to summarize it in a few words and then generate an audio message preview that states a caller, time of call, etc. In one embodiment, the message preview may be used as a custom alert. In another embodiment, the message preview may be used as voicemail preview. Alternatively, if a calling party desires to leave a regular voicemail, he or she may also be prompted to leave a shortened or abridged voicemail. It should be appreciated that a voicemail preview may be provided in other various ways as well.

In addition incoming phone calls or voicemails, it should also be appreciated that custom alerts may be implemented in systems and methods for providing current news, weather, sports updates, emergency broadcasts, calendar reminders, etc. It should also be appreciated that these various applications/implementations may also be provided in a variety of formats, such as audio, video, voicemail, text message, chatroom, GPS or map-based directions, etc. Furthermore, subscriptions to custom alert services, home-monitoring, security systems, biometric monitoring may also be provided. Other various applications/implementations may also be realized.

Figure 3:
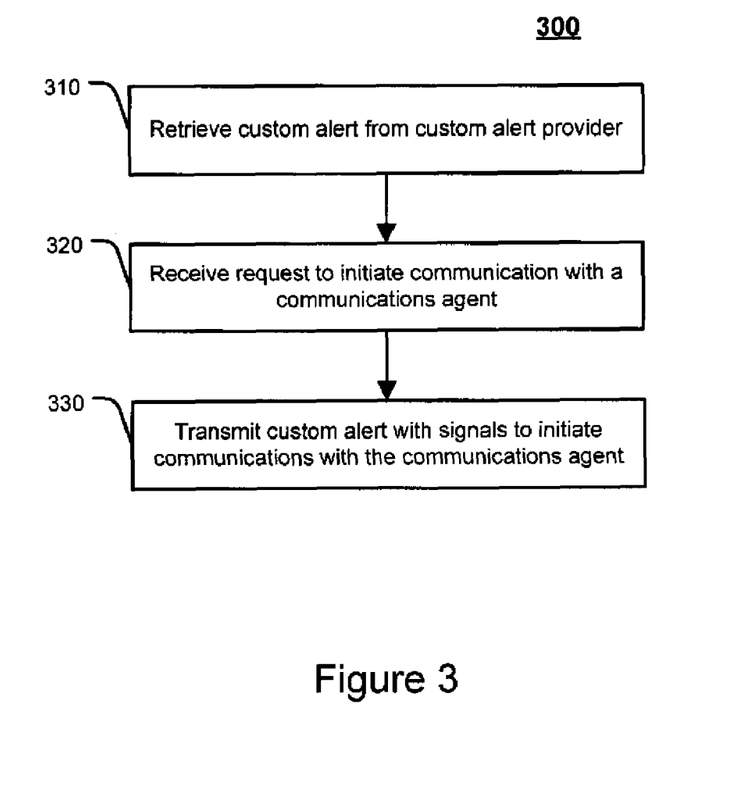
FIG. 3 depicts a flowchart of a method for intercepting and load balancing information, according to an exemplary embodiment.

FIG. 3 depicts a flowchart of a method for providing custom alerts 300, according to an exemplary embodiment. The exemplary method 300 is provided by way of example, as there are a variety of ways to carry out methods disclosed herein. The method 300 shown in FIG. 3 may be executed or otherwise performed by one or a combination of various systems. The method 300 is described below as carried out by at least system 100 in FIG. 1 and system 200 in FIG. 2, by way of example, and various elements of systems 100 and 200 are referenced in explaining the exemplary method of FIG. 3. Each block shown in FIG. 3 represents one or more processes, methods, or subroutines carried in the exemplary method 300. A computer readable media comprising code to perform the acts of the method 300 may also be provided. Referring to FIG. 3, the exemplary method 300 may begin at block 310.

At block 310, a custom alert may be obtained. For example, a processor at the calling party device 110 may be configured to retrieve a custom alert from the custom alert provider 114. In one embodiment, the calling party 112, via the calling party device 110 (e.g., mobile phone), may enter a code on for a desired custom alert. In another embodiment, the calling party 112 may select a custom alert from a menu provided at the calling party device 110. Other various embodiments may also be provided. It should be appreciated that the custom alert may include at least one of a ringtone, recorded voice, image, video, flashing pattern, multimedia, and motion. Other various sensations may also be realized, such as tactile sensation, smell, taste, etc. In one embodiment, the custom alert may be retrieved from a library of custom alerts at the custom alert provider 114. In another embodiment, the custom alert may be generated at the custom alert provider by at least one of recording a voice, recording music, editing music, editing video, capturing an image, capturing a video, setting a flashing pattern, and setting a vibrating pattern.

At block 320, a request to initiate communications may be received. For example, a receiver at the calling party device 110 may be configured to receive, from the calling party 112, a request to initiate communication with the called party device 130. It should be appreciated that the custom alert may be retrieved from the custom alert provider by at least one of selecting, ordering, purchasing, trading, and downloading.

At block 330, one or more signals may be transmitted for communication. For example, a transmitter at the calling party device 10 may be configured to transmit one or more signals over a network to communicate with the called party device 130, wherein transmitting the one or more signals includes transmitting the custom alert for output at the called party device 130.

Figure 4:
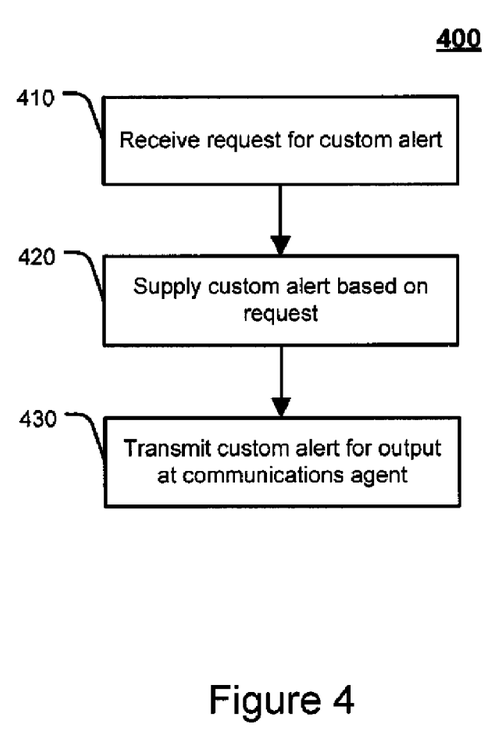
FIG. 4 depicts a flowchart of a method for intercepting and load balancing information, according to another exemplary embodiment.

FIG. 4 depicts a flowchart of a method for providing custom alerts 400, according to another exemplary embodiment. The exemplary method 400 is provided by way of example, as there are a variety of ways to carry out methods disclosed herein. The method 400 shown in FIG. 4 may be executed or otherwise performed by one or a combination of various systems. The method 400 is described below as carried out by at least system 100 in FIG. 1 and system 200 in FIG. 2, by way of example, and various elements of systems 100 and 200 are referenced in explaining the exemplary method of FIG. 4. Each block shown in FIG. 4 represents one or more processes, methods, or subroutines carried in the exemplary method 400. A computer readable media comprising code to perform the acts of the method 400 may also be provided. Referring to FIG. 4, the exemplary method 400 may begin at block 410.

At block 410, a request for a custom alert may be received. For example, a receiver at the custom alert provider 114 may be configured to receive a request for a custom alert from the calling party 112 via the calling party device 110. It should be appreciated that the custom alert includes at least one of a ringtone, recorded voice, image, video, flashing pattern, multimedia, and motion. Other various sensations may also be realized, such as tactile sensation, smell, taste, etc.

At block 420, a custom alert may be supplied. For example, a processor at the custom alert provider 114 may be configured to coordinate and supply the custom alert based on the request for a custom alert. It should be appreciated that supplying the custom alert may include selecting from a library of custom alerts from at least one of the communications device, a data storage system, a server at a service provider of the communications device, and a third party.

At block 430, a custom alert may be transmitted. For example, in one embodiment, a transmitter at the custom alert provider 114 may be configured to transmit the custom alert to the calling party device 110. In another embodiment, the transmitter at the custom alert provider 114 may be configured to transmit the custom alert to the called party device 130.

It should be appreciated that the method 400 may further include generating a custom alert by at least one of recording a voice, recording music, editing music, editing video, capturing an image, capturing a video, setting a flashing pattern, and setting a vibrating pattern. Other various embodiments may also be provided.

Figure 5:
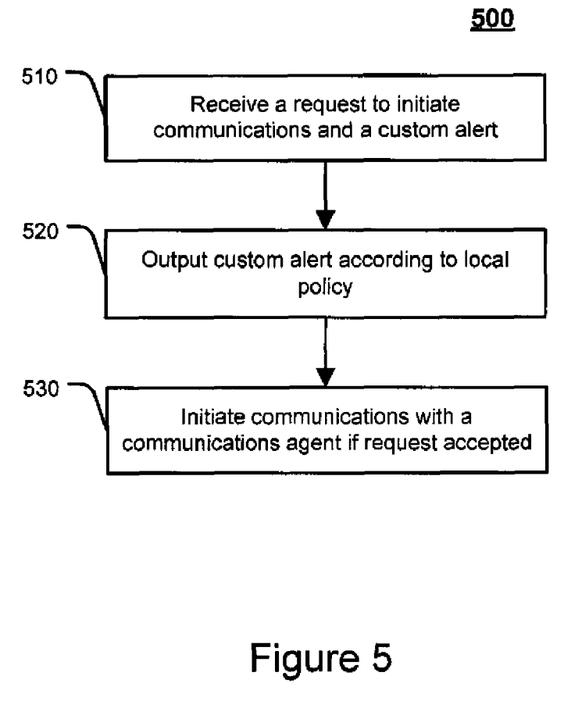
FIG. 5 depicts a flowchart of a method for providing custom alerts, according to another exemplary embodiment.

FIG. 5 depicts a flowchart of a method for providing custom alerts 500, according to another exemplary embodiment. The exemplary method 500 is provided by way of example, as there are a variety of ways to carry out methods disclosed herein. The method 500 shown in FIG. 5 may be executed or otherwise performed by one or a combination of various systems. The method 500 is described below as carried out by at least system 100 in FIG. 1 and system 200 in FIG. 2, by way of example, and various elements of systems 100 and 200 are referenced in explaining the exemplary method of FIG. 5. Each block shown in FIG. 5 represents one or more processes, methods, or subroutines carried in the exemplary method 500. A computer readable media comprising code to perform the acts of the method 500 may also be provided. Referring to FIG. 4, the exemplary method 500 may begin at block 510.

At block 510, a custom alert may be received. For example, a receiver at the called party device 130 may be configured to receive, from the calling party device 110 over a network 120, a custom alert with a request to initiate communication. It should be appreciated that the custom alert comprises at least one of a ringtone, recorded voice, image, video, flashing pattern, multimedia, and vibration.

At block 520, the custom alert may be output. For example, an output at the called party device 130 may be configured to output the custom alert according local policy of the communications device.

For example, in one embodiment, the called party 132 may signal to the called party device 130 or the called party network agent 236 that custom alerts from specifically identified calling parties should be ignored, while all other custom alerts should be presented to the called party 132. In another embodiment, the called party 132 may signal to the called party device 130 or the called party network agent 236 that custom alerts from specifically identified calling parties should be presented to the called party, while all other custom alerts should be ignored. In yet another embodiment, the called party 132 may signal to the called party device 130 or the called party network agent 236 that certain forms of custom alerts should be presented to the called party 132, while other forms of custom alerts should be ignored.

Other examples of local policy for outputting custom alerts may also be provided. For example, a custom alert may be presented as given, presented in an alternative form, or not presented at all. In this example, it should be appreciated that the local policy for these situations may depend upon whether the called party 132 is currently engaged in a communication and/or upon which called party device 130 is currently enabled to receive communication requests. It should be appreciated that many other examples may be realized for local policy that determines whether, where, and/or in what form to present a custom alert. It should be appreciated that such local policy instructions may be stored in the called party device 130 and/or called party network agent 236 for application when a communication request including a custom alert is received.

At block 530, communication may be established. For example, a processor at the called party device 130 may be configured to establish communication with the calling party device 110 in the event the request to initiate communication is accepted.

It should be appreciated that the method 500 may further include storing the customer alert and associating the custom alert with the communications device.

In summary, embodiments may provide a system and method for providing custom alerts that comprehensively and effectively provide a way to preview an incoming call and/or to indicate the importance/priority of that incoming call.

While depicted as various servers and/or devices, it should be appreciated that embodiments may be constructed in software and/or hardware, as a separate and/or stand-alone device, or as part of an integrated transmission and/or switching device.

It should be appreciated that although embodiments are described primarily with incoming phone calls, the systems and methods discussed above are provided as merely exemplary and may have other applications. These may include emergency alerts, voicemail previews, dissemination of various news/information, etc.

Additionally, it should also be appreciated that system support and updating the various components of the system may be easily achieved. For example, a system administrator may have access to one or more of the components of the system, network, and/or device. It should also be appreciated that the one or more system components, servers, and/or devices of the system may not be limited to physical components. These components may be software-based, virtual, etc. Moreover, the various components, servers, and/or devices may be customized to perform one or more additional features and functionalities. Such features and functionalities may be provided via deployment, transmitting and/or installing software/hardware.

It should also be appreciated that each of the communications devices, servers, and/or networks may include one or more processors (not shown) for providing custom alerts. It should be appreciated that one or more data storage systems (e.g., databases) (not shown) may also be coupled to each of the devices or servers of the system. In one embodiment, the one or more data storage systems may store relevant information for each of the servers and system components.

It should be appreciated that the contents of any of these one or more data storage systems may be combined into fewer or greater numbers of data storage systems and may be stored on one or more data storage systems and/or servers. Furthermore, the data storage systems may be local, remote, or a combination thereof to clients systems, servers, and/or other system components. In another embodiment, information stored in the databases may be useful in providing additional personalizations and customizations for providing custom alerts.

By performing the various features and functions as discussed above, custom alerts may be provided to comprehensively and effectively indicate the importance/priority of that incoming call. Not only does this provide an effective and improved technique for providing alerts for previewing incoming calls or voicemail so that overall communications may be enhanced.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A method, comprising:
    retrieving a custom alert from a custom alert provider communicatively coupled to a first communications agent, wherein the custom alert provider is located remotely from the first communications agent;

receiving, from a user via the first communications agent, a request to initiate communication with a second communications agent;

receiving, at the first communications agent, the custom alert from the custom alert provider; and transmitting one or more signals, from the first communications agent, over a network to communicate with the second communications agent, wherein transmitting the one or more signals comprises transmitting the custom alert for output at the second communication agent.

2. The method of claim 1, wherein the custom alert comprises at least one of a ringtone, recorded voice, image, video, flashing pattern, multimedia, and vibration.

3. The method of claim 1, wherein the custom alert is retrieved from a library of custom alerts at the custom alert provider.

4. The method of claim 1, wherein the custom alert is generated at the custom alert provider by at least one of recording a voice, recording music, editing music, editing video, capturing an image, capturing a video, setting a flashing pattern, and setting a vibrating pattern.

5. The method of claim 1, wherein the custom alert is retrieved from the custom alert provider by at least one of selecting, ordering, purchasing, trading, and downloading.

6. A non-transitory computer readable media comprising code which when executed causes a computer to perform the acts of the method of claim 1.

7. A system, comprising:
a processor, at a first communications agent, configured to retrieve a custom alert from a custom alert provider communicatively coupled to the first communications agent, wherein the custom alert provider is located remotely from the first communications agent;

a receiver configured to receive, from a user at the first communications agent, a request to initiate communication with a second communications agent; and a transmitter, at the first communications agent, configured to transit one or more signals over a network to communicate with the second communications agent, wherein transmitting the one or more signals comprises transmitting the custom alert for output at the second communication agent.

8. The system of claim 7, wherein the first communications agent is a first communications device and the second communications agent is a second communications device.

9. A method, comprising:
receiving a request for a custom alert at a custom alert provider, wherein the request is received from a first communications agent that is remotely located from the custom alert provider;

supplying the custom alert based on the request; and transmitting the custom alert to the first communications agent, wherein the first communications agent transmits the custom alert over a network for output at a second communications agent.

10. The method of claim 9, wherein supplying the custom alert comprises selecting from a library of custom alerts from at least one of the communications agent, a data storage system, a server at a service provider of the communications agent, and a third party.

11. The method of claim 9, wherein the custom alert compromises at least one of a ringtone, recorded voice, image, video, flashing pattern, multimedia, and vibration.

12. The method of claim 9, further compromising generating a custom alert by at least one recording a voice, recording music, editing music, editing video, capturing an image, capturing a video, setting a flashing pattern, and setting a vibrating pattern.

13. A non-transitory computer readable media comprising code which when executed causes a computer to perform the acts of the method of claim 9.

14. A system, comprising:
a receiver configured to receive a request for a custom alert from a first communications agent, wherein the receiver is located remotely from the first communications agent;

a processor configured to coordinate and supply the custom alert based on the request; and a transmitter configured to transmit the custom alert to the first communications device, wherein the first communications agent transmits the custom alert over a network for output at a second communications agent.

15. The system of claim 14, wherein the first communications agent is a communications device.

16. A method, comprising:
receiving at a customer alert provider, from a calling communications agent over a network, a request to initiate communication and a custom alert, wherein the custom alert provider is located remotely from the first communications agent;

outputting the custom alert according to local policy; and initiating communication with the calling communication agent in the event the request to initiate communication is accepted wherein the calling communications agent transmits the custom alert over a network for output at a called communications agent.

17. The method of claim 16, wherein the custom alert comprises at least one of a ringtone, recorded voice, image, video, flashing pattern, multimedia, and vibration.

18. The method claim 16, further comprising storing the customer alert and associating the custom alert with the communications agent.

19. A non-transitory computer readable media compromising code which when executed causes a computer to perform the acts of the method of claim 16.

20. A system, comprising:
a receiver configured to receive, from a first communications agent over a network, a request to initiate communication and a custom alert, wherein the custom alert provider is located remotely from the first communications agent;

an output configured to output the custom alert to the first communications agent according local policy of the first communications agent; and a processor configured to initiate communication with the first communications agent in the event the request to initiate communication is accepted, wherein the first communications agent transmits the custom alert over a network for output at a second communications agent.

21. The system of claim 20, wherein the communications agent is a communications device.

* * * * *